United States Patent
Wu et al.

(10) Patent No.: US 8,154,730 B2
(45) Date of Patent: Apr. 10, 2012

(54) ARC FLASH DETECTION METHOD (75) Inventors: Juntao Wu, Niskayuna, NY (US); Hua Xia, Altamont, NY (US); Robert Deveaux, Stouffville (CA); Zhihong Mao, Stouffville (CA); David John Allcock, Markham (CA); Qin Chen, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/233,212

(22) Filed: Sep. 15, 2011

(65) Prior Publication Data
US 2012/0002195 A1 Jan. 5, 2012

Related U.S. Application Data (62) Division of application No. 12/770,827, filed on Apr. 30, 2010, now Pat. No. 8,040,517.

(51) Int. Cl.
*G01N 21/55* (2006.01)
(52) U.S. Cl. .......................... 356/445; 361/2
(58) Field of Classification Search .......... 356/432, 356/445; 250/554; 361/2, 14
See application file for complete search history.

(56) References Cited

U.S. PATENT DOCUMENTS

| | | | | |
|---|---|---|---|---|
| 4,369,364 A * | 1/1983 | Kuntermann | ............ | 250/227.11 |
| 4,516,022 A * | 5/1985 | Lindgren | ................. | 250/227.11 |
| 4,539,480 A * | 9/1985 | Artinano et al. | ............. | 250/551 |
| 4,685,018 A * | 8/1987 | Tada et al. | ......................... | 361/1 |
| 4,702,553 A * | 10/1987 | Buchmuller et al. | ............ | 385/12 |
| 4,791,518 A * | 12/1988 | Fischer | ............................ | 361/2 |
| 4,866,681 A * | 9/1989 | Fertig | ............................ | 367/140 |
| 4,903,248 A * | 2/1990 | Fertig | ............................ | 367/140 |
| 4,940,933 A * | 7/1990 | Jenkins | .................... | 324/765.01 |
| 4,988,861 A * | 1/1991 | Hakoun et al. | .......... | 250/227.11 |
| 5,125,749 A * | 6/1992 | Leugers et al. | ............. | 356/432 |
| 5,170,050 A * | 12/1992 | Giboulet et al. | ......... | 250/227.11 |
| 5,185,686 A * | 2/1993 | Hansen et al. | .................. | 361/45 |
| 5,933,308 A * | 8/1999 | Garzon | ........................... | 361/62 |
| 5,940,547 A * | 8/1999 | Schumacher et al. | ......... | 385/12 |
| 6,141,192 A * | 10/2000 | Garzon | ........................... | 361/5 |
| 6,154,683 A * | 11/2000 | Kessler et al. | ............... | 700/150 |
| 6,229,680 B1 * | 5/2001 | Shea | ............................... | 361/42 |
| 6,236,548 B1 * | 5/2001 | Marmonier | .................... | 361/78 |
| 6,313,641 B1 * | 11/2001 | Brooks | ......................... | 324/536 |
| 6,433,976 B1 * | 8/2002 | Phillips | .......................... | 361/42 |
| 6,693,438 B2 * | 2/2004 | Shea | ............................ | 324/555 |
| 6,772,077 B1 * | 8/2004 | Parker et al. | .................... | 702/76 |
| 6,903,357 B2 * | 6/2005 | Robb | ............................. | 250/554 |
| 7,035,068 B2 * | 4/2006 | Shea | ............................... | 361/42 |
| 7,499,251 B2 * | 3/2009 | Byron | ............................. | 361/42 |
| 2003/0169051 A1 | 9/2003 | Tallman et al. | | |
| 2004/0079905 A1 * | 4/2004 | Robb | ............................. | 250/554 |
| 2006/0164097 A1 | 7/2006 | Zhou et al. | | |
| 2007/0023618 A1 * | 2/2007 | Viehmann | ................ | 250/227.11 |
| 2007/0263329 A1 | 11/2007 | Zhou et al. | | |
| 2010/0139368 A1 * | 6/2010 | Kotovsky et al. | ............ | 73/24.06 |
| 2010/0321838 A1 * | 12/2010 | Wu et al. | ......................... | 361/42 |

FOREIGN PATENT DOCUMENTS

GB 1476527 6/1977

* cited by examiner

*Primary Examiner* — Roy M Punnoose
(74) *Attorney, Agent, or Firm* — Ann M. Agosti (57) ABSTRACT

An arc flash detection method includes transmitting light via an optical fiber to a sensor and transmitting light from the sensor that includes components representative of acoustic waves and light for filtering and processing to detect an occurrence of an arc flash.

9 Claims, 9 Drawing Sheets

ARC FLASH DETECTION METHOD

CROSS REFERENCE TO RELATED APPLICATIONS

This application is a Divisional of U.S. patent application Ser. No. 12/770,827, entitled "Arc Flash Detection System and Method", filed 30 Apr. 2010, which is herein incorporated by reference.

BACKGROUND

The invention relates generally to arc flash detection and, in particular, to arc flash sensors.

Electric power circuits and switchgear equipment have conductors separated by insulation. Air space often serves as part or all of this insulation in some applications. If the conductors are too close to each other or voltage exceeds the insulation level, an arc can occur between conductors. Air or any other insulation (gas, solid, or liquid) between conductors can become ionized, making the insulation conductive and thereby enabling an arcing event. Arc events may induce temperatures that can reach as high as 20,000° C., vaporize conductors and adjacent materials, and release an explosive energy that destroys surrounding circuits.

An arc flash is typically the result of a rapid energy release due to an arcing fault between two phases or between one phase and a neutral or ground. An arc flash can produce high heat, intense light, and acoustic waves similar to that of an explosion. However, an arc fault current typically includes a much lower magnitude as compared to a short circuit current, and circuit breakers do not necessarily react to such lower magnitudes of current. Typically, arc flash mitigation techniques use standard fuses and circuit breakers. However, such techniques have slow response times and are not fast enough to mitigate an arc flash.

One technique to mitigate arc faults is to reduce the response time of arc sensors. For example, reduced response time may be achieved by detecting specific characteristics of the arcing event such as light. Optical sensors detect light within an enclosure and determine the occurrence of the arc flash event. However, such a method of light detection may lead to erroneous arc detection when stray light or light from other sources is detected. Further, such methods do not provide information regarding the location of the arcing event. Other techniques include implementing pressure sensors within the enclosure to detect arc flash induced pressure changes. Such methods, however, result in delayed detection as pressure build-up takes a significant amount of time.

There is a need for improved arc flash prevention mechanism that has an improved response time and minimizes false alarms.

BRIEF DESCRIPTION

Briefly, a sensor to simultaneously detect light and acoustic waves is presented. The sensor includes one or more optical fibers and a diaphragm disposed near one end of at least one of the one or more optical fibers. The diaphragm is configured to vibrate upon incidence of acoustic waves from an arc flash and reflect a light beam into at least the one of the one or more of the optical fibers. A semi-transparent region is disposed around the one or more optical fibers to diffuse light originating from the arc flash into at least one of the one or more optical fibers.

In another embodiment, an arc flash detection system is presented. The detection system includes one or more optical fibers and a light source coupled to one of the one or more optical fibers and configured to generate a laser beam. The system further includes a sensor comprising a diaphragm disposed near one end of the one of the one or more optical fibers and configured to vibrate upon incidence of acoustic waves from an arc flash and reflect the laser beam into at least one of the one or more optical fibers. The sensor further includes a semi-transparent region disposed around the one or more optical fibers to diffuse light originating from the arc flash into at least one of the one or more optical fibers. The system includes one or more photo detectors coupled to the sensor and configured to receive a reflected laser beam indicative of acoustic waves from the arc flash and light originating from the arc flash and a processor coupled to the one or more photo detectors and configured to detect an occurrence of an arc flash.

In another embodiment, a method is proposed. The method includes transmitting a light via optical fiber to a sensor and transmitting light that includes components representative of acoustic waves and light from the sensor for filtering and processing to detect the occurrence of an arc flash.

In yet another embodiment, an electrical distribution system is presented. The electrical distribution system includes an arc flash detection system having a light source configured to generate a light beam. A plurality of sensors are disposed around the electrical distribution system, each of the sensors having one or more optical fibers and a diaphragm disposed near one end of at least one of the one or more optical fibers, the diaphragm configured to vibrate upon incidence of acoustic waves from an arc flash and reflect a light beam into at least one of the one or more of the optical fibers. Each of the sensors further include a semi-transparent region disposed around the one or more optical fibers to diffuse light originating from the arc flash into at least one of the one or more optical fibers. The electrical distribution system further includes at least one photo detector coupled to the sensors and configured to detect reflected light beams from the sensors and a processor coupled to the at least one photo detector and configured to generate an arc fault signal upon detection of an arc flash within the electrical distribution system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
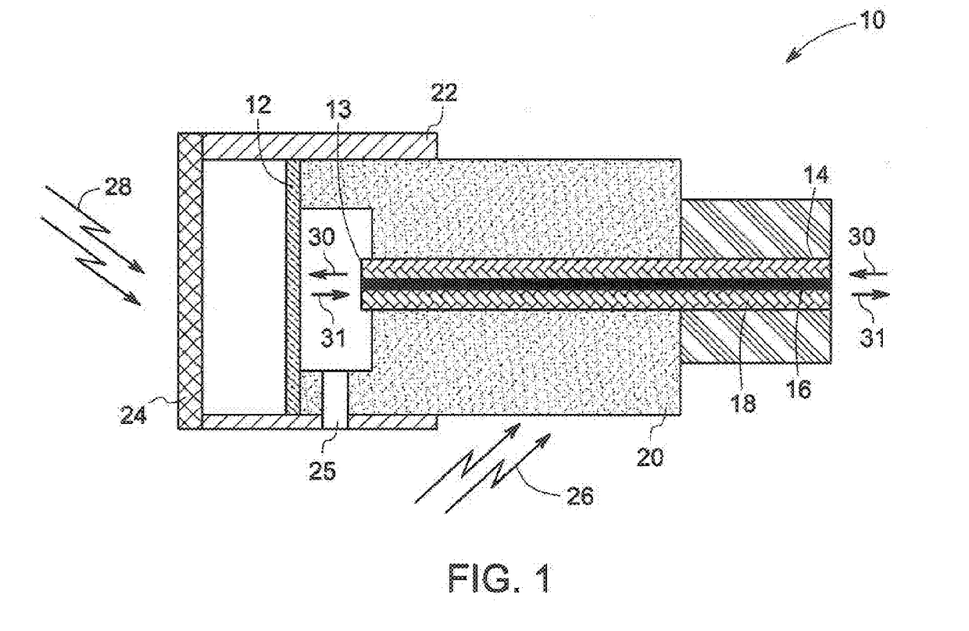
FIG. 1 illustrates an arc flash sensor according to one embodiment of the invention.

FIG. 1 illustrates an arc flash sensor according to an embodiment of the invention. The sensor 10 includes a diaphragm 12 disposed near one end 13 of an optical fiber 14 having a fiber core 16 and a fiber cladding 18. In one embodiment, the diaphragm 12 is configured to vibrate upon incidence of sound (acoustic waves) from an arc flash and reflect light from a laser beam 30 into the fiber core 16. As used herein, acoustic waves may include pressure waves as well. In one embodiment, the diaphragm comprises opaque material made of thin film and disposed in an elongated position. In another embodiment, the diaphragm comprises a semi-transparent material. The semi-transparent material may include for example, a thin film that has been pre-strained to respond to external air pressure dynamics and allow light transmission of about 30% to about 60%. In one embodiment, to avoid saturation of photo detectors or detector arrays, the diaphragms comprises a metalized polymeric material. During fabrication of the diaphragm, metalized thin film deposition on the polymer film may be controlled to achieve desired thickness.

To provide protection for the diaphragm during operation while still allowing acoustic waves to be detected, diaphragm 12 may be enclosed within a protective sleeve 22 and a protective screen 24 that permits the acoustic waves from the external environment to reach the diaphragm. A fiber holder 20 is disposed around the optical fiber 14. In one embodiment, the fiber holder includes a semi-transparent region configured to diffuse light originating from the arc flash into the fiber core 16. One or more optional holes 25 measuring about 0.5 mm to about 2 mm in diameter may be provided to enhance the light detection from arc flash. In this embodiment, arc flash generated light is directed through the optional hole 25 towards fiber 14. In embodiments wherein the protective screen 24 and diaphragm 12 permit some amount of light to pass, light from an arc flash may additionally be directed towards fiber 14 through the protective screen and the diaphragm.

In an exemplary operation, the sensor 10 is configured to receive acoustic waves 28 and light 26 from an arc flash. The sensor 10 is configured to obtain signals representative of acoustic wave and light simultaneously. Such an integrated approach of sensing acoustic wave and light simultaneously minimizes false alarms and enables early arc flash detection. Fiber core 16 is configured to direct laser beam 30 on the diaphragm 12. Diaphragm 12 is configured to vibrate based on the intensity and frequency of acoustic waves from the arc flash. Based on the vibrations, a unique pattern of light is reflected from the diaphragm in the direction of beam 31. Simultaneously, light originating from the arc flash is incident on the semi-transparent region 20. The semi-transparent region 20 is configured to diffuse light towards the fiber core 16. In one embodiment, the semi-transparent region 20 is configured to diffuse light is at ultraviolet wavelengths. The distance between one end 13 of the optical fiber and the diaphragm 12 is optimized such that the reflected beam from the diaphragm 12 reaches the fiber core 16 without significant transmission losses.

Figure 2:
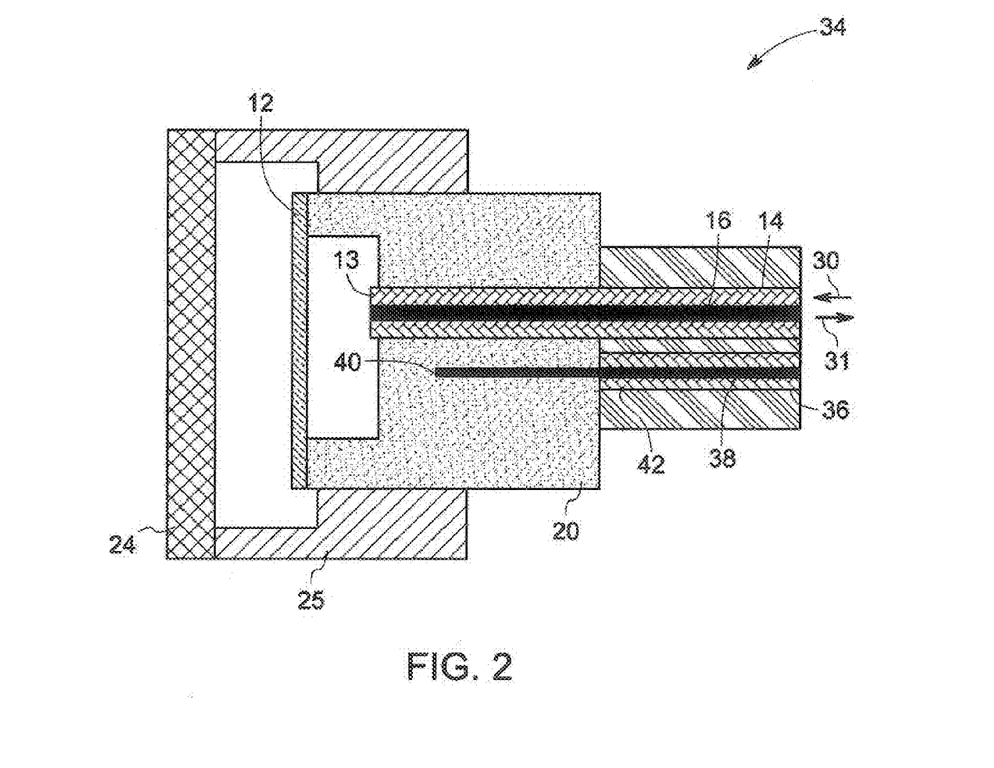
FIG. 2 illustrates an arc flash sensor according to another embodiment of the invention.

FIG. 2 illustrates an arc flash sensor according to another embodiment of the invention. The sensor 34 illustrates a dual fiber core design comprising two optical fibers 14, 36 having corresponding fiber cores 16, 38. One end 13 of the first optical fiber 14 is disposed proximate to the diaphragm 12. In the event of arc flash, acoustic wave originating form the arc flash generate vibrations in the diaphragm. Reflected beam 31 captures such vibrations that are further processed to detect an arc flash. One end 40 of the second optical fiber 36 is disposed within the semi-transparent region 20 such that optical fiber 36 is configured to transmit diffused light resulting from the arc flash. In operation, there are two optical fibers 14, 36 with first optical fiber 14 dedicated for acoustic wave detection and the second optical fiber 36 for light detection. In the illustrated embodiment, fiber core 16 is configured for both directing the laser beam 30 on the diaphragm 12 and transmitting back the reflected beam 31 from the diaphragm 12 for further processing. In one embodiment, cladding 41 around the end 40 of the optical fiber 36 is removed to increase light coupling efficiency.

Figure 3:
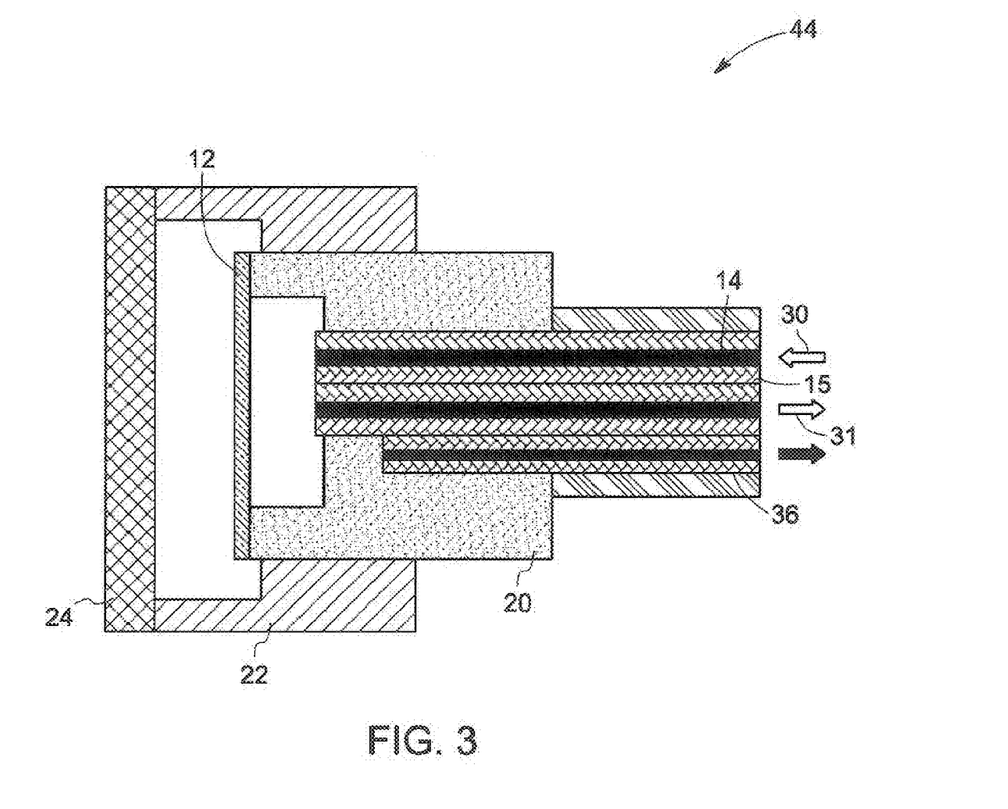
FIG. 3 illustrates an arc flash sensor according to another embodiment of the invention.

FIG. 3 illustrates an arc flash sensor according to another embodiment of the invention. Sensor 44 includes three optical fibers 14, 15, 36 arranged in a manner that first optical fiber 14 is configured to transmit laser beam 30 onto the diaphragm 12 and second optical fiber 15 is configured to receive the reflected beam 31 from the diaphragm 12. Third optical fiber 36 as described in FIG. 2, is configured to detect light from the arc flash.

Figure 4:
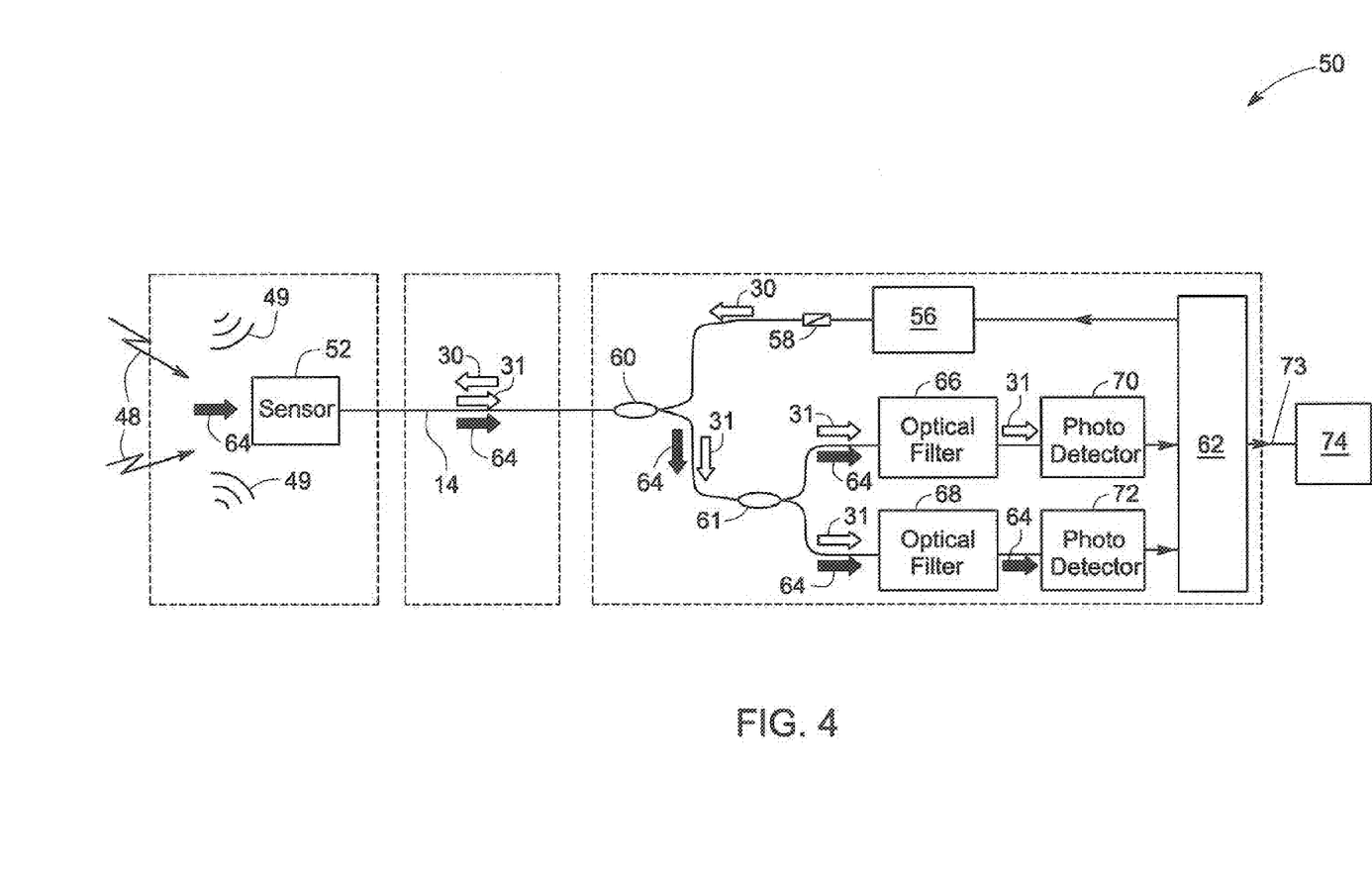
FIG. 4 is a block diagram of an arc detection system according to one embodiment of the invention.

FIG. 4 is a block diagram of an arc detection system according to an embodiment of the invention. The detection system 50 includes a sensor 52 coupled to an optical fiber cable 14. A light source 56 is coupled to the optical fiber cable 14 via an isolator 58 and a fiber splitter 60. In one embodiment, the light source 56 comprises a light-emitting diode. In another embodiment, the light source 56 comprises a laser diode that emits light at about near infrared wavelengths. A processor 62 is configured to process the combined light returning from the sensor 52 that includes reflected light 31 from the sensor and light diffused 64 through the semi-transparent region. In one embodiment, the processor 62 is coupled to the fiber splitter 60 via optical filters 66, 68 and photo detectors 70, 72 and is further configured to generate an arc fault signal 73. The optical filters are configured to let through certain wavelength of light and to block the rest. Photo detectors 70, 72 are configured to generate an equivalent electrical voltage based upon the intensity and wavelength of incident light. Such electrical voltages are convenient for further processing via the processor 62. A protection device 74 may be coupled to the processor 62 in order to mitigate the arc flash. In one embodiment, the protective device includes a protective relay configured to trip upon receiving a signal.

In an exemplary operation, the arc detection system 50 is configured to detect acoustic waves and light from an arc flash. In case of an arc flash event 48, acoustic waves 49 and light 64, among the other things, are emitted from the arc flash. Sensor 52 is configured to detect light and acoustic waves simultaneously. Sensor 52 may include any of the embodiments described in FIGS. 1-3, for example. In one embodiment, the arc detection system 50 is adapted to implement sensor 10 having a single optical fiber 14 as discussed in FIG. 1. Light source 56 such as a laser diode produces laser beam that is transmitted via the optical fiber to the sensor. Isolator 58 is disposed on the transmission end of the light source 56 such that the reflected beam 31 from the sensor and the light 64 from the arc flash are blocked from entering the laser light source 56. Fiber splitter 60 is configured to transmit laser beam 30 in one direction and transmit the reflected light 31 in another direction. In one embodiment, the signal beam is further passed through fiber coupler 61 and then through the optical filters 66, 68. In a more specific example of this embodiment, the optical filter 66 comprises a band-pass filter (of about 1550 nm) configured to pass light having wavelength for which the reflected beam is expected to be present to photo detector 70, and the optical filter 68 comprises a low-pass filter (of about <700 nm) configured to pass light having wavelength for which the arc flash light is expected to be present to the photo detector 72. Processor 62 is configured to process the signals from both the photo detectors 70, 72 and generate an arc fault signal 73 in case of arc flash event 48. Protective device 74 is activated based upon the arc fault signal 73 and configured to interrupt power to mitigate the arc flash.

Figure 5:
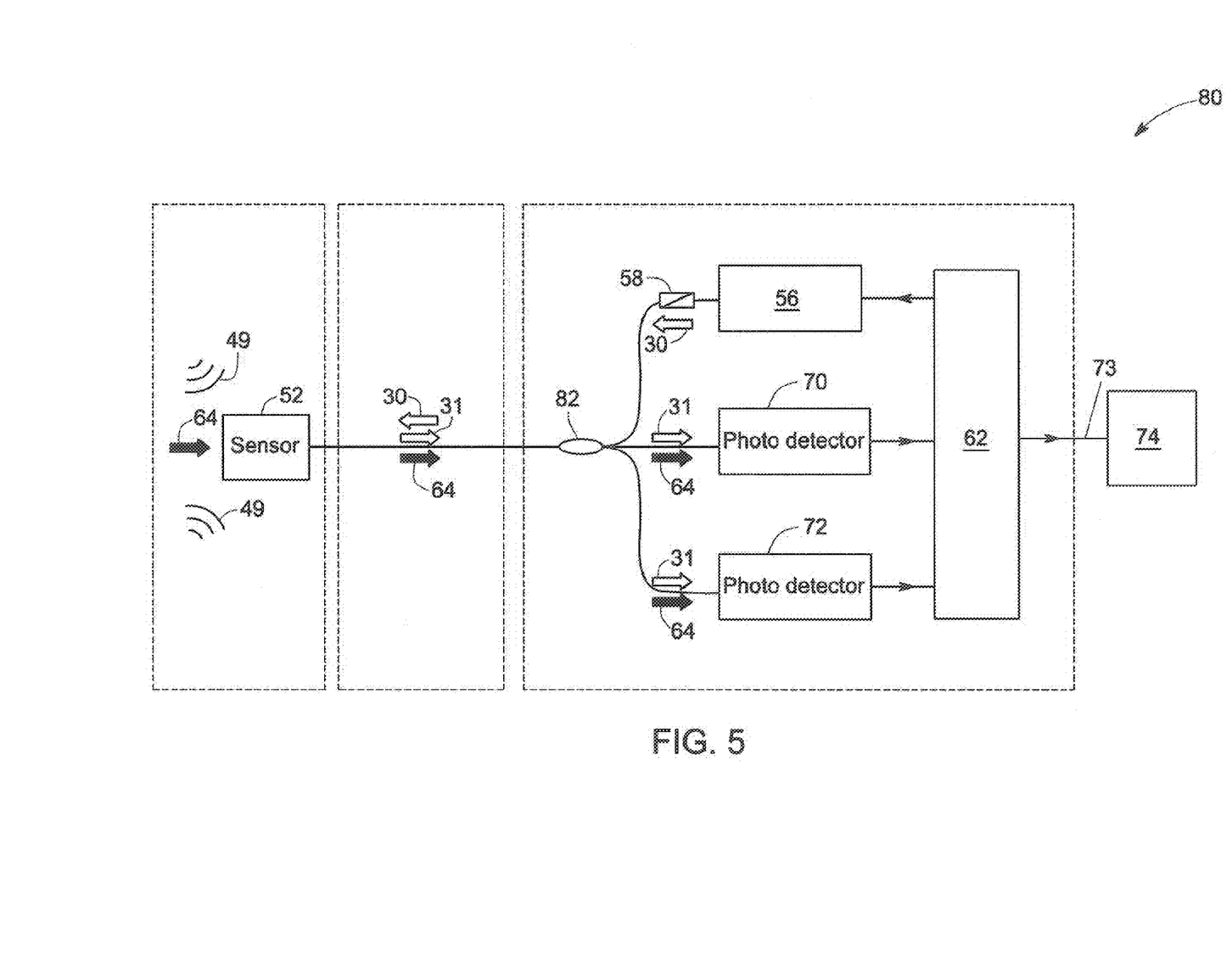
FIG. 5 is a block diagram of arc detection system according to another embodiment of the invention.

FIG. 5 illustrates a block diagram of arc detection system 80 according to another embodiment of the invention. Instead of including two separate couplers 60 and 62, a 1×3 fiber splitter 82 is implemented to couple the light source 56 and the photo detectors 70, 72. Furthermore, FIG. 5 is used to illustrate that the filters of FIG. 4 are not required in every embodiment. In the embodiment of FIG. 5, the photo detectors are configured to detect a particular range of wavelengths. In one example, photo detector 70 is configured to detect light in the range of about 1550 nanometer wavelength and photo detector 72 is configured to detect light in the range from about 200 nanometer to about 700 nanometer wavelength.

Figure 6:
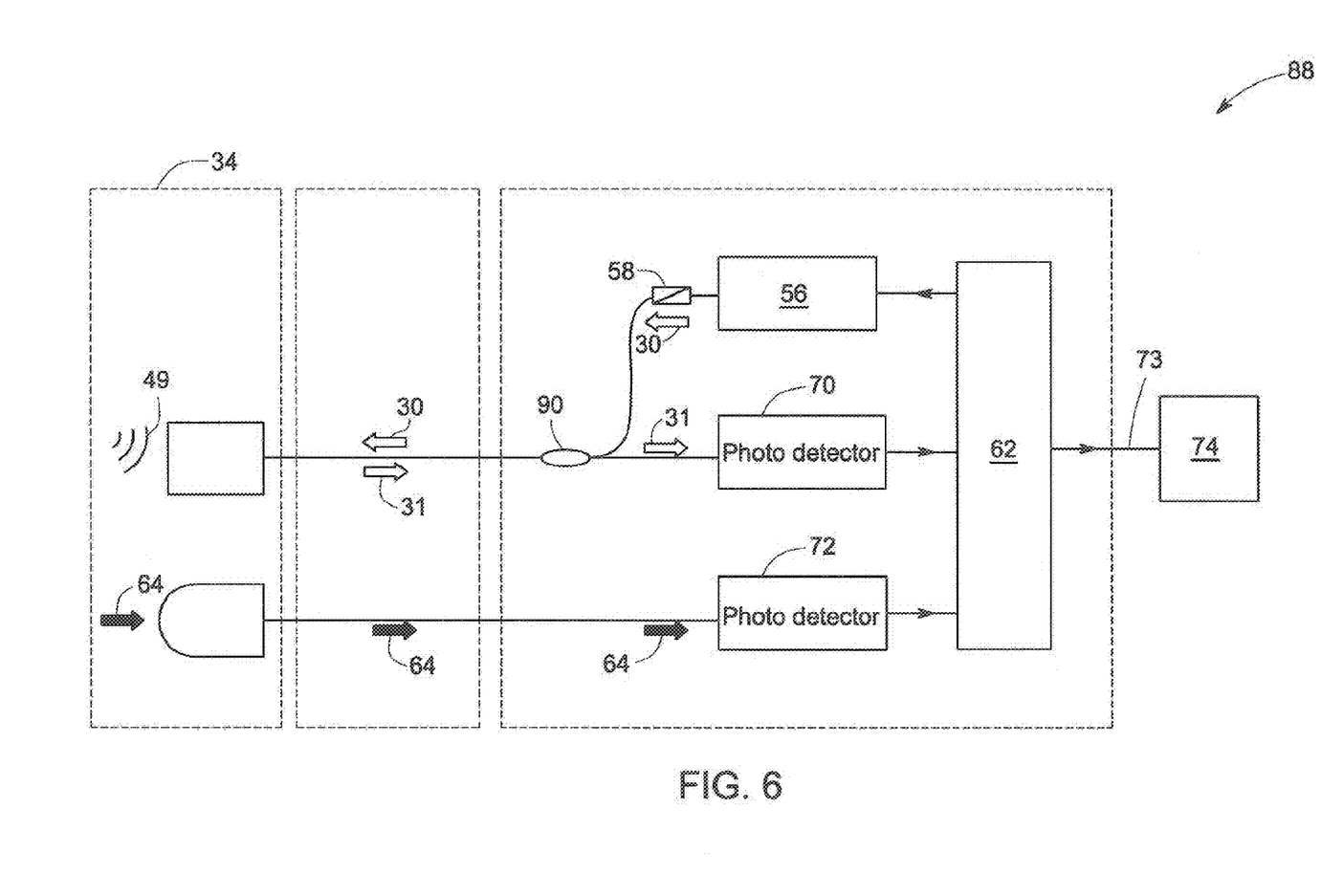
FIG. 6 is a block diagram of another arc detection system.
Figure 7:
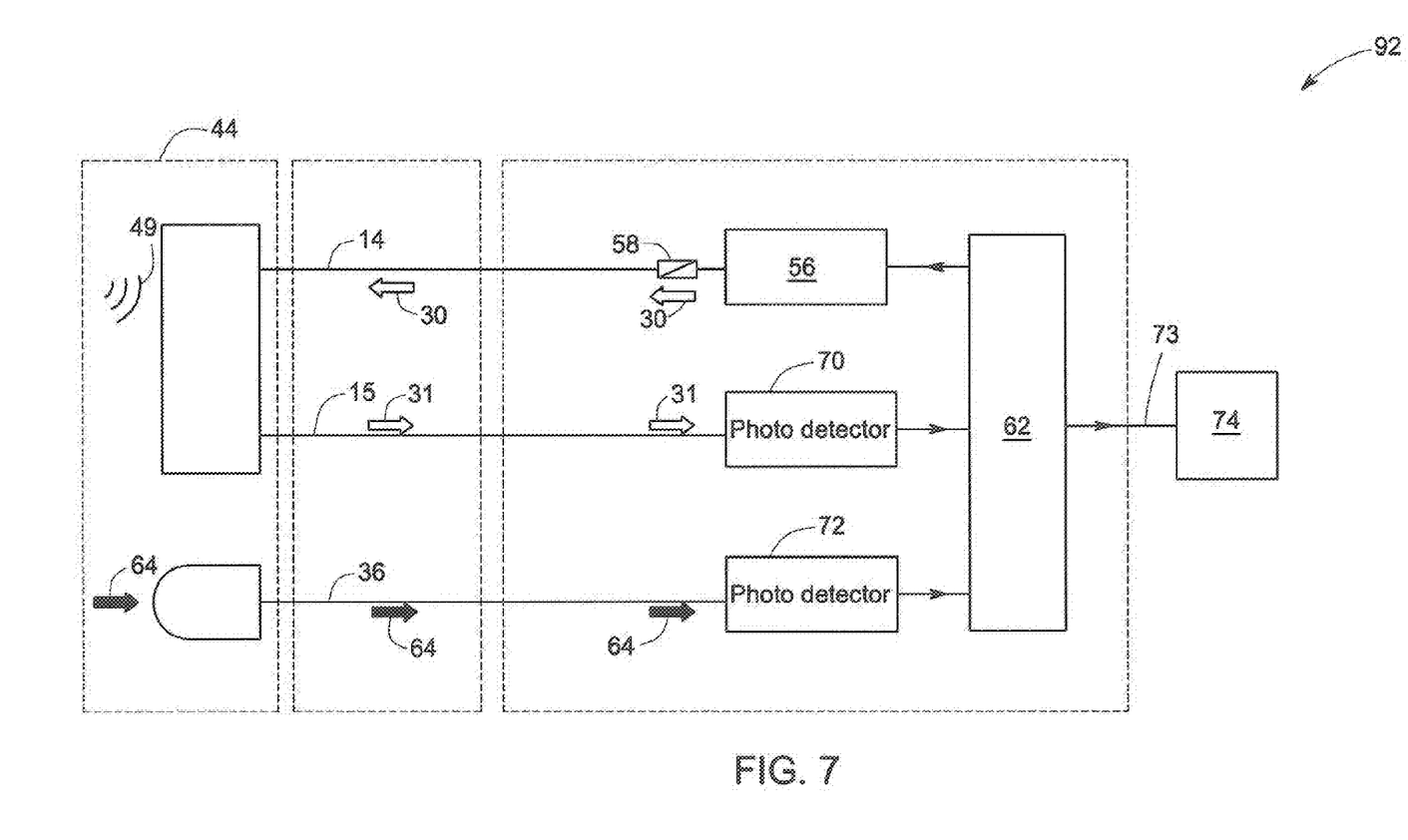
FIG. 7 is a block diagram of another arc detection system.

FIG. 6 is a block diagram of arc detection system wherein at least two optical fibers are present in a sensor, such as described with respect to FIG. 2. In operation, light is directed from light source through isolator 58 and coupler 90 to fiber 14 to sensor 34. Optical fiber 14 is configured to transmit reflected beam 31 from the diaphragm (12 as referenced in FIG. 2), and optical fiber 36 is configured to transmit light 64 from the arc flash. In the embodiment of FIG. 6, fiber coupler 90 is implemented to couple light source 56 and photo detector 70 to the sensor 34. FIG. 7 is an alternative embodiment wherein three optical fibers 14, 15, 36 (within a sensor of the type discussed with respect to FIG. 3) may be implemented in arc detection system 92.

Figure 8:
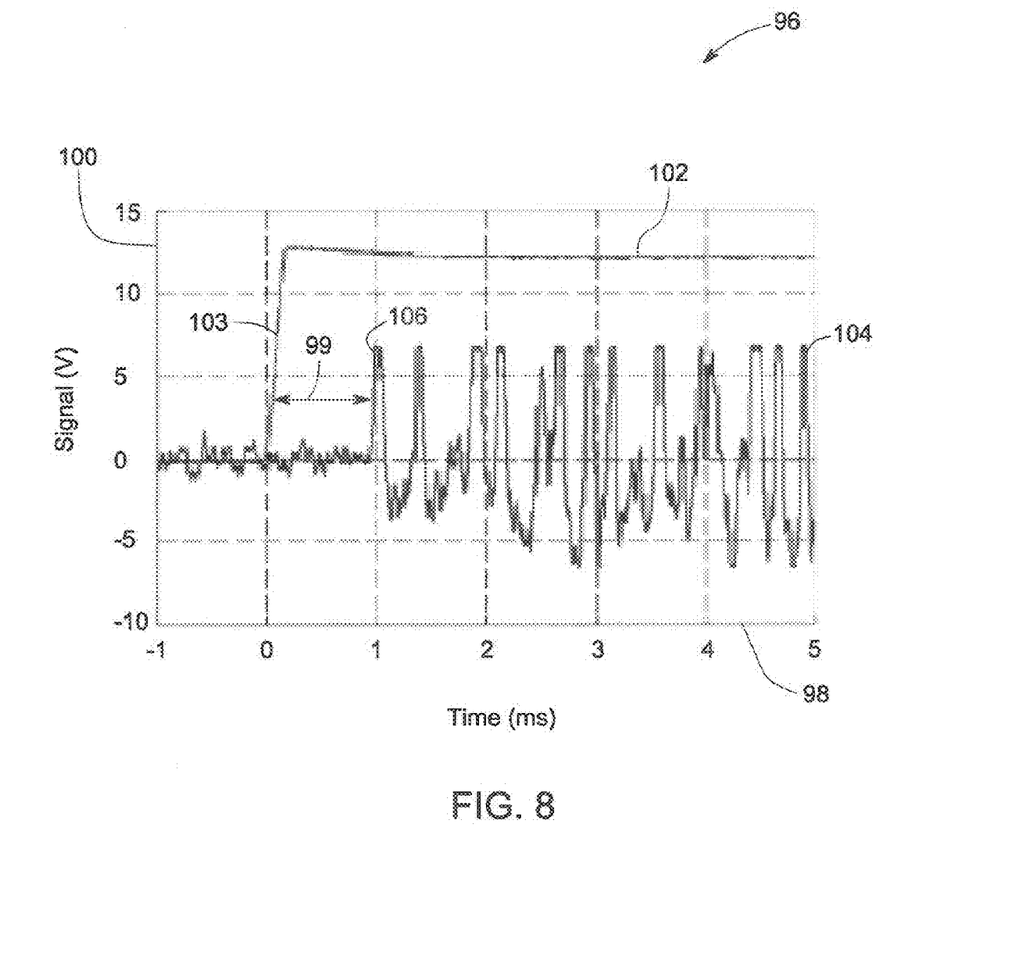
FIG. 8 is a graph of acoustic and light signals detected from an arc flash over time according to an embodiment of the invention.

FIG. 8 is a graph illustrating acoustic and light signal magnitudes detected from an arc flash according to an embodiment of the invention. In an exemplary embodiment, the graph 96 is obtained by measuring the acoustic and light signals in a simulated system having 480 V, 100 kA setup. The graph 96 depicts time in milliseconds on X-axis 98 and voltage on Y-axis 100. In the illustrated embodiment, the profile 102 depicts the light component of the arc flash whereas profile 104 depicts the acoustic component of the arc flash. Relative time delay 99 between the detected arc flash induced light 103 and acoustic waves 106 serves as an unique signature. In the certain embodiments, such relative time delay is in the order of about 0.5 ms to about 10 ms. Such a combination of profiles 102, 104 that form a unique pattern for a given system may be stored for future comparison. Using both acoustic and light data, and their relative time sequence is expected to mitigate the possibility of false alarm, and provide the location of arc flash event.

Figure 9:
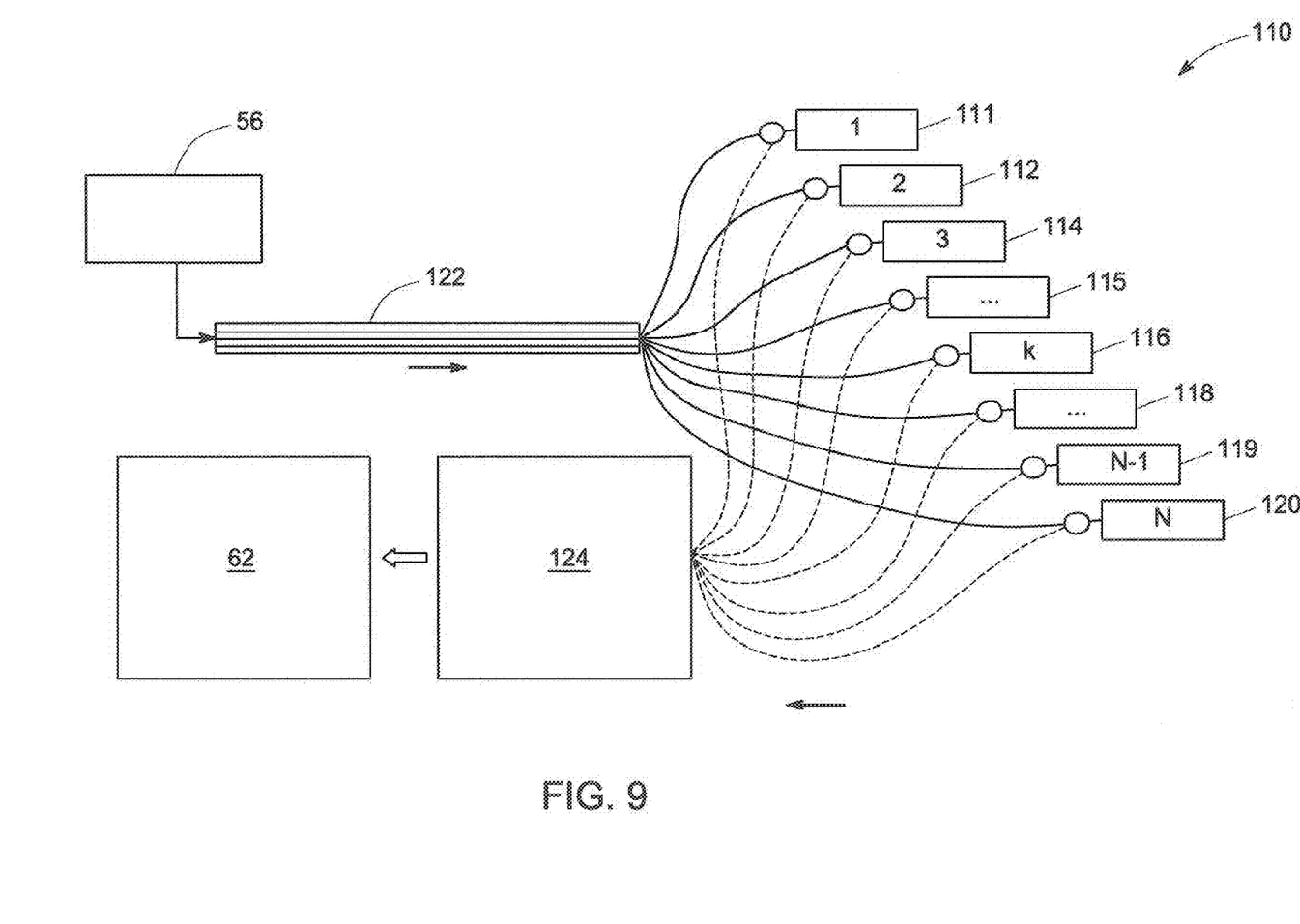
FIG. 9 illustrates an electrical distribution system implementing arc sensors according to one embodiment of the invention.

FIG. 9 illustrates an electrical distribution system implementing arc flash sensors according to an embodiment of the invention. Electrical distribution system 110 includes a plurality of sensors 111-120 disposed around the system and configured to detect arc flash events. The sensors may include any design as discussed in FIGS. 1-3. Light source 56 is coupled to optical fiber cable 122 and a plurality of sensors 111-120. Each sensor is coupled to photo detector array 124 via fiber couplers. A processor 62 is configured to generate an arc fault signal in case an arc fault is detected within the electrical distribution system. In one embodiment, processor 62 is configured to detect a location of the arc flash within the electrical distribution system based upon the signals from the plurality of sensors disposed around the distribution system.

Figure 10:
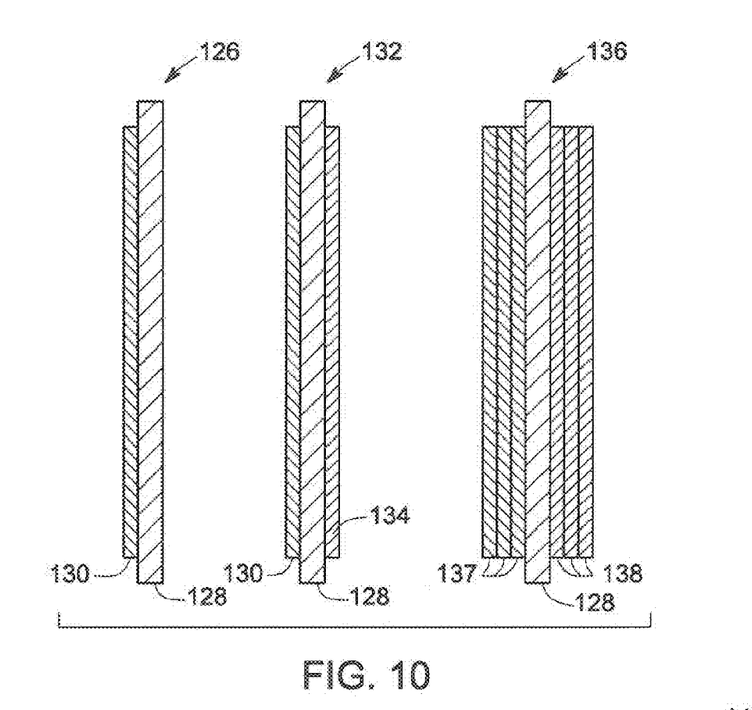
FIG. 10 illustrates several embodiments of the diaphragm implemented in arc flash sensors.

FIG. 10 illustrates several embodiments of the diaphragm implemented in an arc flash sensor according to an embodiment of the invention. In an exemplary embodiment the diaphragm 12 (FIG. 1) includes polymer film with metal film deposition as indicated by the reference numeral 126. A single layer of thin metal film 130 (about 5 nm to about 30 nm in thickness) is deposited on one side of the polymer film 128. In another embodiment, reference numeral 132 illustrates at least two layers of thin metal films 130, 134 deposited on each side of the polymer film 128. In another embodiment, reference numeral 136 illustrates the deposition of multiple layers of thin metal films 137, 138 deposited on one or both sides of the polymer film 128. The thickness of thin metal film or films controls the light transmission ratio and the frequency responses of the diaphragm with respect to acoustic waves.

Figure 11:
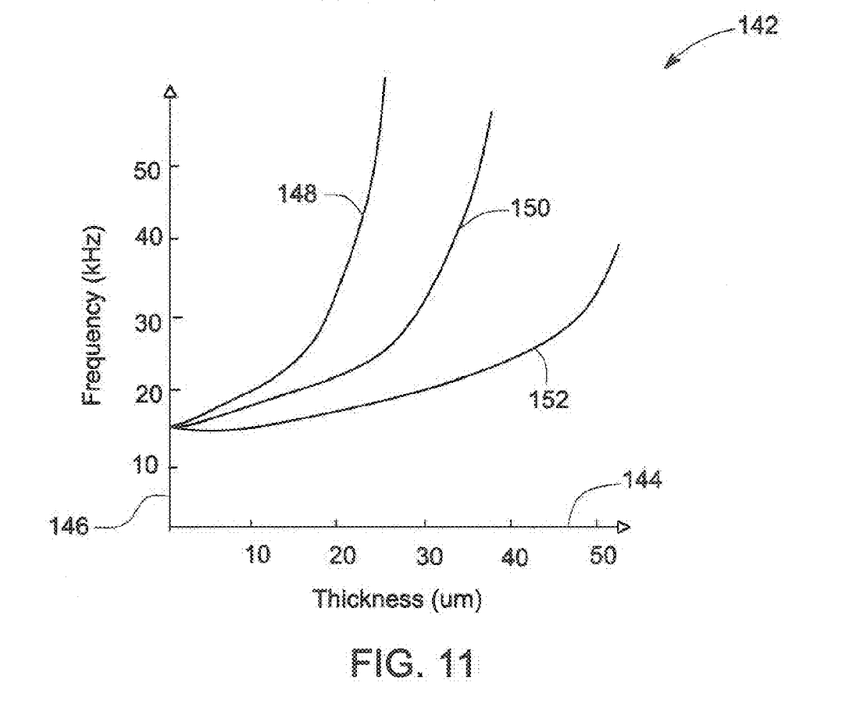
FIG. 11 illustrates frequency response for the diaphragms in FIG. 10.

FIG. 11 illustrates frequency responses for the diaphragms in FIG. 10. Graph 142 illustrates frequency measured in kHz on the Y-axis 146 and thickness measured in micrometers on X-axis 144. Profiles 148-152 are obtained from simulation. Profile 152 is an exemplary frequency response for a diaphragm configured to comprise a polymer film only. Profile 150 illustrates an exemplary frequency response for a diaphragm comprising thin metal film on both sides of the polymer film (132 in FIG. 10). Profile 148 illustrates an exemplary frequency response for a diaphragm comprising multilayer thin metal film on both sides of the polymer film (136 in FIG. 10).

Advantageously, sensors as proposed in various embodiments of the invention may utilize low cost material and simple manufacture techniques. Further, such sensors have fast response and high sensitivity. Integrated sensors simultaneously detect radiation such as light and dynamic acoustic wave signals. Such integrated sensors enable fast detection of arc flash events. Optical fibers implemented for arc detection have advantages such as immunity to electromagnetic interference, reduced size and weight, distribution capability, and no additional power requirement. As used herein, the terms "a" and "an" do not denote a limitation of quantity, but rather denote the presence of at least one of the referenced item.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method comprising:
transmitting light via an optical fiber to a sensor;
transmitting light from the sensor that includes components representative of acoustic waves and light;
processing light from the sensor to detect an occurrence of an arc flash.
2. The method of claim 1 wherein processing comprises determining signal magnitudes of the light and the acoustic waves.
3. The method of claim 1 wherein processing further comprises determining a time delay between detection of acoustic waves that are indicative of an arc flash and detection of light that is indicative of an arc flash.
4. The method of claim 3 wherein processing further comprises storing the time delay for future comparison and arc flash occurrence detection.

5. The method of claim 1, further comprising filtering light from the sensor prior to processing light from the sensor.

6. The method of claim 5, wherein filtering comprises detecting light of a plurality of wavelengths.

7. The method of claim 1 wherein transmitting light to a sensor comprises transmitting light to a sensor configured to simultaneously detect light and acoustic waves.

8. The method of claim 1 further comprising generating an arc fault signal to provide an alert upon detection of the occurrence of an arc flash.

9. The method of claim 1, further comprising activating a protective device upon detection of the occurrence of an arc flash.

\* \* \* \* \*